United States Patent [19]

Lilienthal

[11] Patent Number: 5,072,362

[45] Date of Patent: Dec. 10, 1991

[54] APPARATUS FOR CONTROLLING A VESSEL'S HORN

[75] Inventor: Frank A. Lilienthal, Newport, R.I.

[73] Assignee: Boating Laboratories, Inc., Farmington Falls, Me.

[21] Appl. No.: 447,199

[22] Filed: Dec. 7, 1989

[51] Int. Cl.⁵ .......................... G05B 19/00; G08B 3/00
[52] U.S. Cl. ..................................... 364/188; 340/984
[58] Field of Search ....................... 364/550, 188, 189; 340/388, 404, 984; 116/19, 24, DIG. 43, 18, 26; 307/132 E

[56] References Cited

U.S. PATENT DOCUMENTS

| | | |
|---|---|---|
| 541,505 | 6/1895 | Rymer . |
| 945,311 | 1/1910 | Fendrich ........................ 362/86 X |
| 1,258,000 | 3/1918 | Hall . |
| 1,515,888 | 11/1924 | Saunders . |
| 2,971,187 | 2/1961 | Marr et al. ........................ 340/384 |
| 3,684,895 | 8/1972 | Edelson ........................ 307/132 E |

Primary Examiner—Parshotam S. Lall
Assistant Examiner—Michael Zanelli
Attorney, Agent, or Firm—Cesari & McKenna

[57] ABSTRACT

An apparatus for controlling a vessel's horn and automatically sounding navigational signals is disclosed. The apparatus provides a plurality of predetermined horn signals and horn modes, any of which may be selected by pressing an appropriate key on a keypad. The apparatus includes fog modes which will automatically repeat an appropriate horn signal within a predetermined period of time. The apparatus permits a helmsman and other crew members to attend to other duties without constant attention to the vessel's horn.

6 Claims, 7 Drawing Sheets

APPARATUS FOR CONTROLLING A VESSEL'S HORN

BACKGROUND OF THE INVENTION

1. Field of the Invention

The present invention relates generally to the field of marine navigational aids and, more specifically, to horns used by vessels to sound navigational signals.

2. Discussion of the Prior Art

For vessels navigating at sea or upon other bodies of water, certain "rules of the road" or official navigation signals have been established by authorities such as the United States Coast Guard. Each navigational signal consists of a series of horn blasts which a vessel may sound to indicate an intention to make a turn, to leave the dock, a request to open a bridge, etc. Each signal consists of a unique sequence of "short" and "long" horn blasts.

Various problems arise in attempting to adhere to the rules of the road. For example, a helmsman is frequently preoccupied with steering the vessel while simultaneously monitoring various instruments and may, as a result, fail to sound the proper signal or may erroneously sound the wrong signal for the intended maneuver.

Also, in the presence of fog, the rules of the road require that a particular signal be repeatedly sounded according to a precise timing requirement. For example, if fog is present and the vessel is under power and underway, the correct signal is a single "long" blast once every two minutes. Assuming that the vessel's horn is controlled manually, a crew member must manually sound the signal and use a stopwatch or timer to keep track of the elapsed time.

In the prior art, various mechanical devices have been developed to control a vessel's horn or to aid in sounding the horn. Such devices typically include gears or other rotating members which operate to sound a particular horn signal when an operator actuates a lever or other triggering device.

Such mechanical devices, however, exhibit several disadvantages. First, by its nature, a mechanical horn control device is mechanically linked with a particular horn or horn system on a particular vessel and may not be readily adapted for use with other types of horns or other vessels.

Second, most mechanical horn control devices are limited in the sense that they can only sound one or two signals on an automatic basis. Other signals must be sounded manually by an operator, which again increases the potential for erroneous signalling.

Third, although some mechanical horn control devices are capable of repeatedly sounding "fog" signals on an automatic basis, they do not allow an operator to temporarily override the fog signal to sound another signal on demand.

SUMMARY OF THE INVENTION

In brief summary, the present invention provides a device for automatically controlling a vessel's horn in accordance with any of a number of predetermined horn signals and horn modes. By virtue of the automatic control provided by the present invention, the user's attention and hands are advantageously freed to attend to other more important tasks such as steering, navigation and the like.

The device includes a keypad-type display from which the user may select any of the predetermined horn signals or modes. The display may be illuminated for ease of operation during darkness.

Each predetermined horn signal consists of a single sequence of long and short horn blasts which is used to indicate the status or intention of the vessel, such as a "turn to starboard" or "engines astern." Typically, the predetermined horn signals represent those signals which are most frequently used by the vessel. To sound any of the predetermined horn signals, the user simply presses the appropriate key on the keypad display and the device operates to immediately sound the selected signal without further action by the user.

Each predetermined horn mode consists of a sequence of long and short horn blasts which indicates a vessel's status, but which is periodically repeated without further action by the user. Like the horn signals, a desired horn mode is selected by the user by pressing the appropriate key on the keypad display. Among the predetermined horn modes may be one or more "fog" modes in which a particular sequence of horn blasts is repeatedly sounded in accordance with a predetermined timing requirement. Thus, use of the predetermined horn modes provided by the present invention substantially eliminates the distraction and potential for error caused by continuously keeping time and sounding the vessel's horn in a manual fashion. In addition, the horn modes are subject to temporary override if the user selects any of the predetermined horn signals for immediate sounding.

If circumstances arise where manual control of the vessel's horn is preferred, the user may quickly and easily use a manual key on the keypad to sound the horn without disabling or interrupting the predetermined timing for the fog modes.

The device is designed to operate without causing significant interference with other instruments such as a vessel's compass. The device is readily adapted to either new or existing horns or horn systems and is disposed within a housing which is weather resistant.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
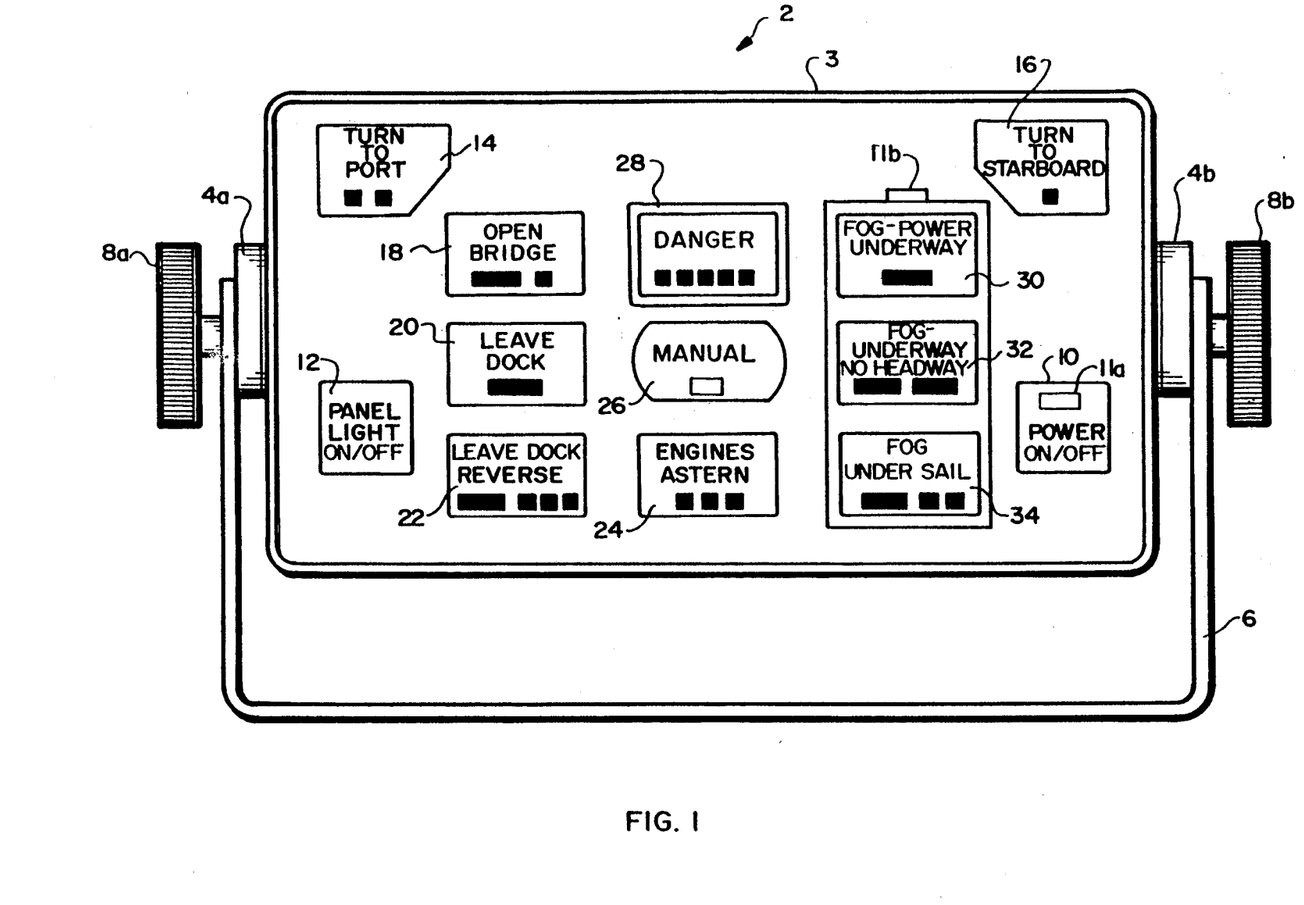
FIG. 1 is a front elevation view of a controller for a vessel's horn constructed in accordance with the preferred embodiment of the present invention.

FIG. 1 is a front view of a controller 2 for a vessel's horn that embodies the present invention. A housing 3 is fitted with a mounting hub 4a, 4b on either of its sides. A mounting bracket 6 is rotatably attached to the mounting hubs 4 by two knobs 8a, 8b. The mounting bracket 6 may be secured to a desired surface (not shown), such as an instrument panel, wall or ceiling in a vessel's wheelhouse. The knobs 8 permit a user to rotate the controller 2 with respect to the bracket 6 in order to provide a suitable viewing angle.

The front face of the controller 2 comprises a membranetype keypad having a plurality of "keys," each of which is delineated by a "box" containing an appropriate legend describing the function of the key. For example, a POWER ON/OFF key 10, located in the lower righthand portion of the keypad, may be pressed to either activate or deactivate the controller 2. Similarly, a PANEL LIGHT ON/OFF key 12 operates when pressed to either activate or deactivate illumination of the keypad. A MANUAL key 26, located near the center of the keypad, allows a user to manually sound the vessel's horn on demand without disabling the automatic control provided by the controller 2.

The POWER ON/OFF key 10 includes a light emitting diode (LED) 11a. When the POWER ON/OFF key 10 is pressed causing the controller 2 to be activated, the LED 11a is turned on, thus providing a visual reminder to the user that the controller 2 is activated. Conversely, when the POWER ON/OFF key 10 is pressed causing the controller 2 to be deactivated, the LED 11a is turned off.

Representative examples of the functions of the other keys shown in FIG. 1 will now be discussed. Except for the POWER ON/OFF key 10, the PANEL LIGHT ON/OFF key 12 and the MANUAL key 26, all of the other keys operate when pressed to either (1) sound a predetermined horn signal, or (2) initiate a predetermined horn mode.

For example, assuming that the controller 2 was previously activated by pressing the POWER ON/OFF key 10, if a user presses the TURN TO STARBOARD key 16, the controller 2 causes the vessel's horn to sound a single "short" blast, which is the correct signal (as defined by the "rules of the road") to indicate a turn to starboard. A visual reminder of this single "short" blast signal is a single "short" line on the TURN TO STARBOARD key 16.

Similarly, if the user presses the TURN TO PORT key 14, the controller 2 will cause the vessel's horn to sound two "short" blasts, which is the correct signal to indicate a turn to port. The TURN TO PORT key 14 includes two "short" lines as a reminder of the correct signal for a turn to port.

The keys denoted by reference numerals 18, 20, 22, 24 and 28 all function in a manner which is analogous to keys 14 and 16. That is, each of those keys, when pressed, will result in the sounding of a predetermined horn signal that is associated with the pressed key. The selected horn signal will sound only once in response to each depression of the associated key.

The keys denoted by reference numerals 30, 32 and 34 perform different functions than those just described. Each, of keys 30, 32 and 34 initiates a predetermined horn mode in which a predetermined horn signal is sounded repeatedly on a continuous basis until the mode is canceled or overridden.

As a representative example, consider FOG-UNDERWAY NO HEADWAY key 32. Key 32 is pressed to sound a signal that indicates (1) the presence of fog and (2) that the vessel is underway, but making no headway. When key 32 is pressed, the controller 2 will initially cause the vessel's horn to sound two "long" blasts and will also start a timer. The controller monitors the timer so that once a predetermined period expires, the controller 2 will automatically cause the horn to sound the two "long" blasts again and will restart the timer. This special timing requirement is necessary because the "rules of the road" require that, in the presence of fog, an appropriate signal must be sounded (repeated) within a fixed time period of, for example, two minutes. Thus, in response to the pressing of key 32, the controller 2 operates in a predetermined horn mode (fog mode) in which a predetermined horn signal is automatically repeated within a fixed time period without further action by the user. Once initiated, the controller 2 will continue to operate in the predetermined horn mode until the controller 2 is either deactivated by pressing the POWER ON/OFF key 10 or any of keys 30, 32 or 34, as described in detail below.

The keys denoted by reference numerals 30 and 34 also function to initiate predetermined horn modes which are similar to that described in connection with key 32. Specifically, key 30 is used to initiate a horn mode which signals (1) the presence of fog and (2) that the vessel is under power and underway. Similarly, key 34 initiates a horn mode which signals (1) the presence of fog and (2) that the vessel is under sail or engaged in commercial fishing, restrained by its draft or is restricted in its maneuvering.

When any of keys 30, 32 or 34 is pressed, an LED 11b is turned on to provide a visual reminder to the user that one of the predetermined horn modes is in effect. When the horn mode is canceled or the controller 2 is deactivated, the LED 11b is turned off.

Figure 2:
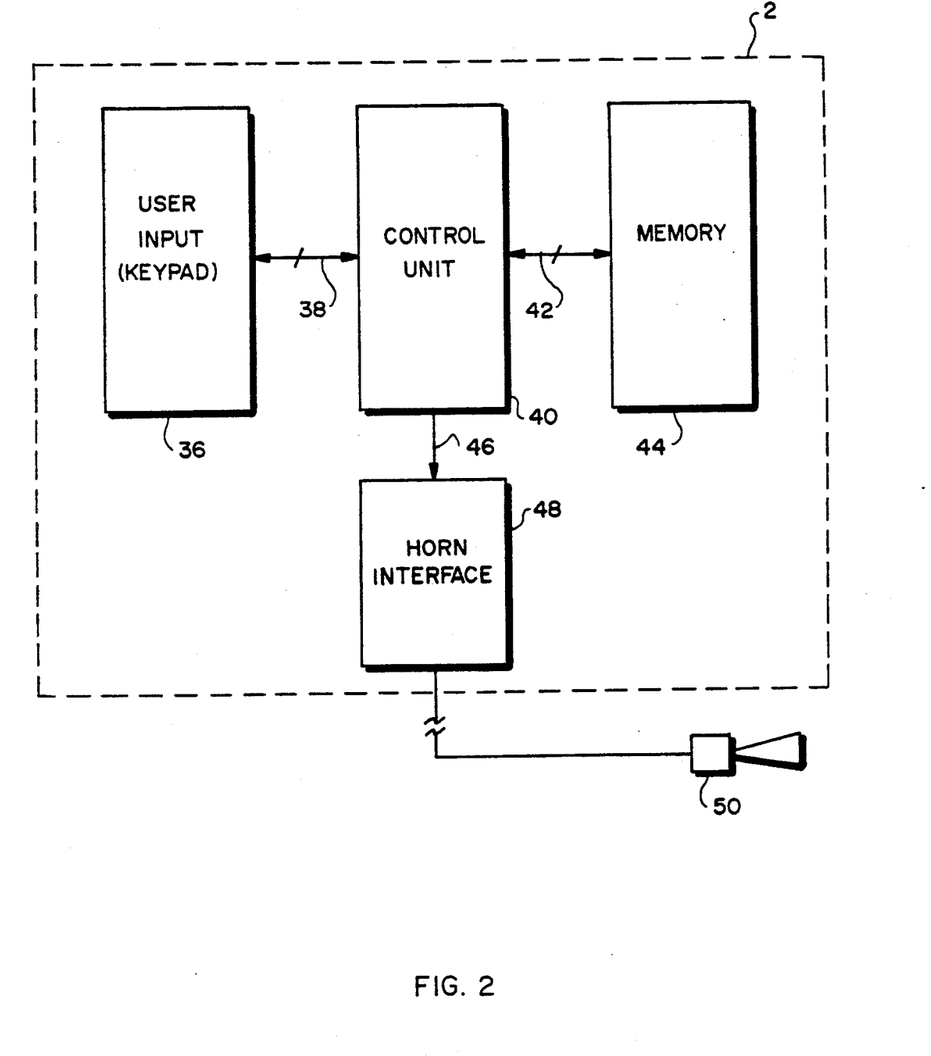
FIG. 2 is a functional block diagram of the controller shown in FIG. 1.

Referring now to FIG. 2, there is depicted a block diagram of the circuitry contained with the controller 2 of FIG. 1. A user input 36, which comprises the keypad shown in FIG. 1, is connected by a plurality of lines 38 to a control unit 40. The control unit 40 is connected by a plurality of lines 42 to a memory 44. The control unit 40 is also connected via a line 46 to a horn interface 48. The horn interface 48 is connected to the vessel's horn or horn system 50.

The general functions represented by the blocks of FIG. 2 will now be briefly described. When a user presses one of the keys on the keypad, electronic signals which identify the pressed key are transmitted via lines 38 to the control unit 40. The control unit 40 interprets the signals received from the user input 36 and, in response, addresses the memory 44 via lines 42. The memory 44 contains information regarding each of the horn signals and horn modes available for selection from the keypad (i.e., the number of horn blasts to sound, the duration of each blast, whether to repeat the signal using a timer, etc.). Thus, when the memory 44 is addressed by the control unit 40 regarding a particular horn signal or horn mode, the memory 44 transmits the relevant information to the control unit 40 via lines 42. In response, the control unit 40 processes the information received from the memory 44 and transmits appropriate electronic signals via lines 46 to the horn interface 48. In turn, the horn interface 48 actuates the vessel's horn 50 to sound the appropriate navigational signal.

Figure 3A:
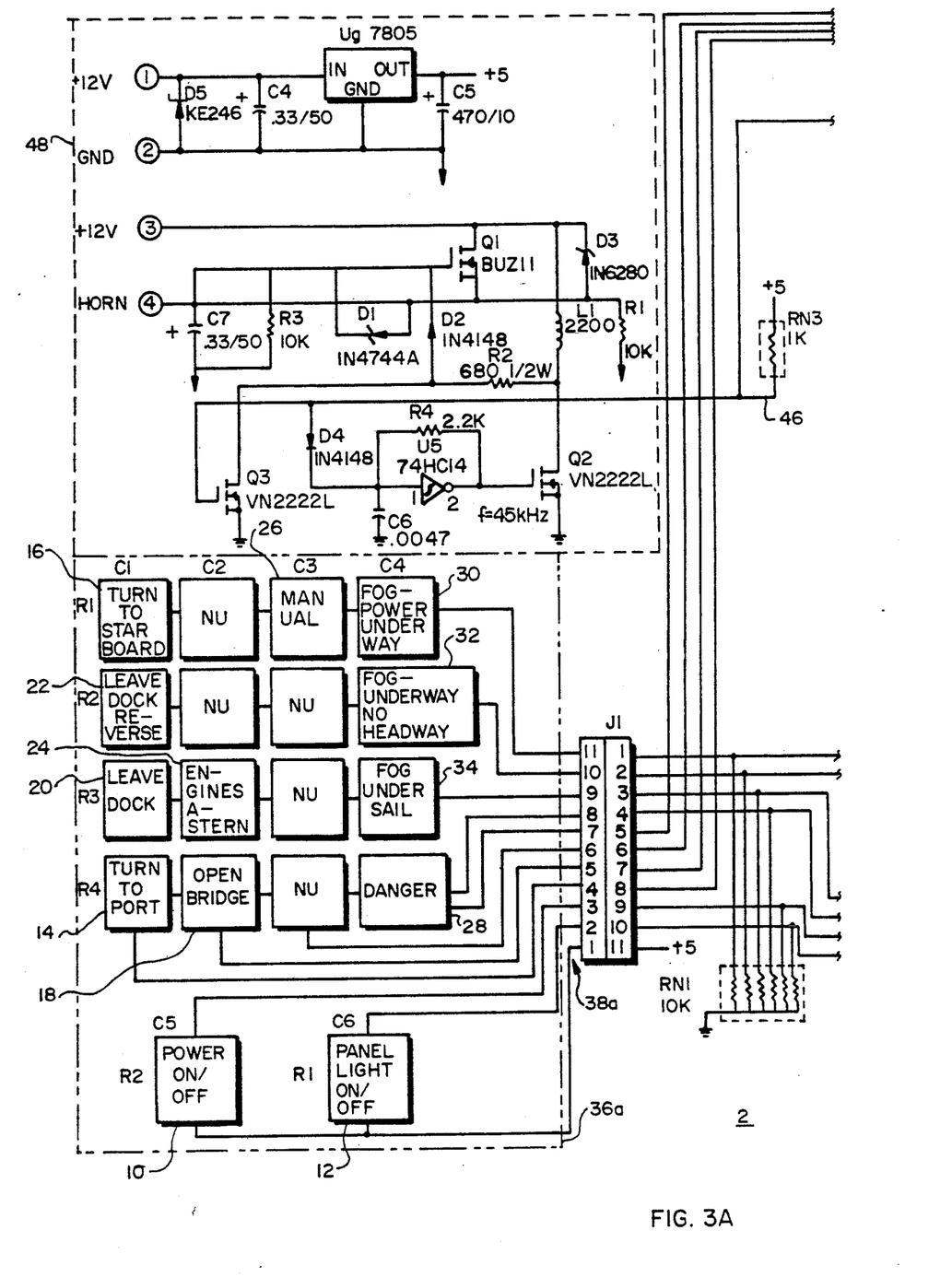
FIGS. 3A-3D are a detailed circuit diagram of the controller shown in FIG. 1.
Figure 3B:
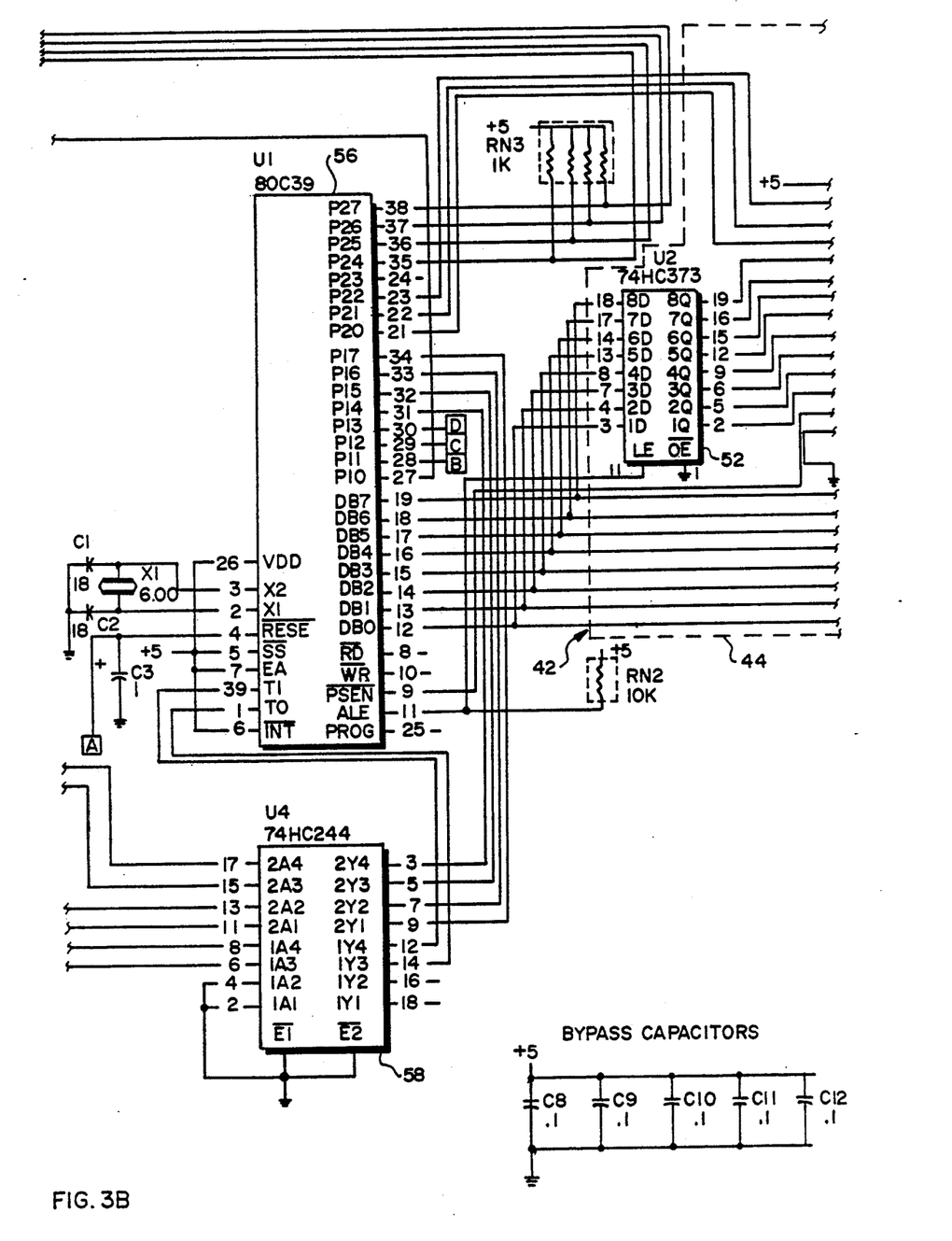
Figure 3C:
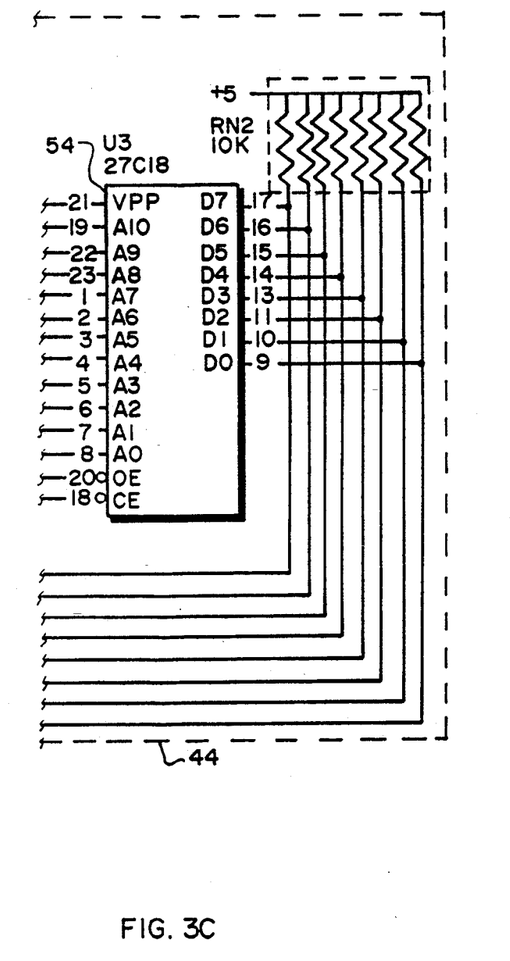
Figure 3D:
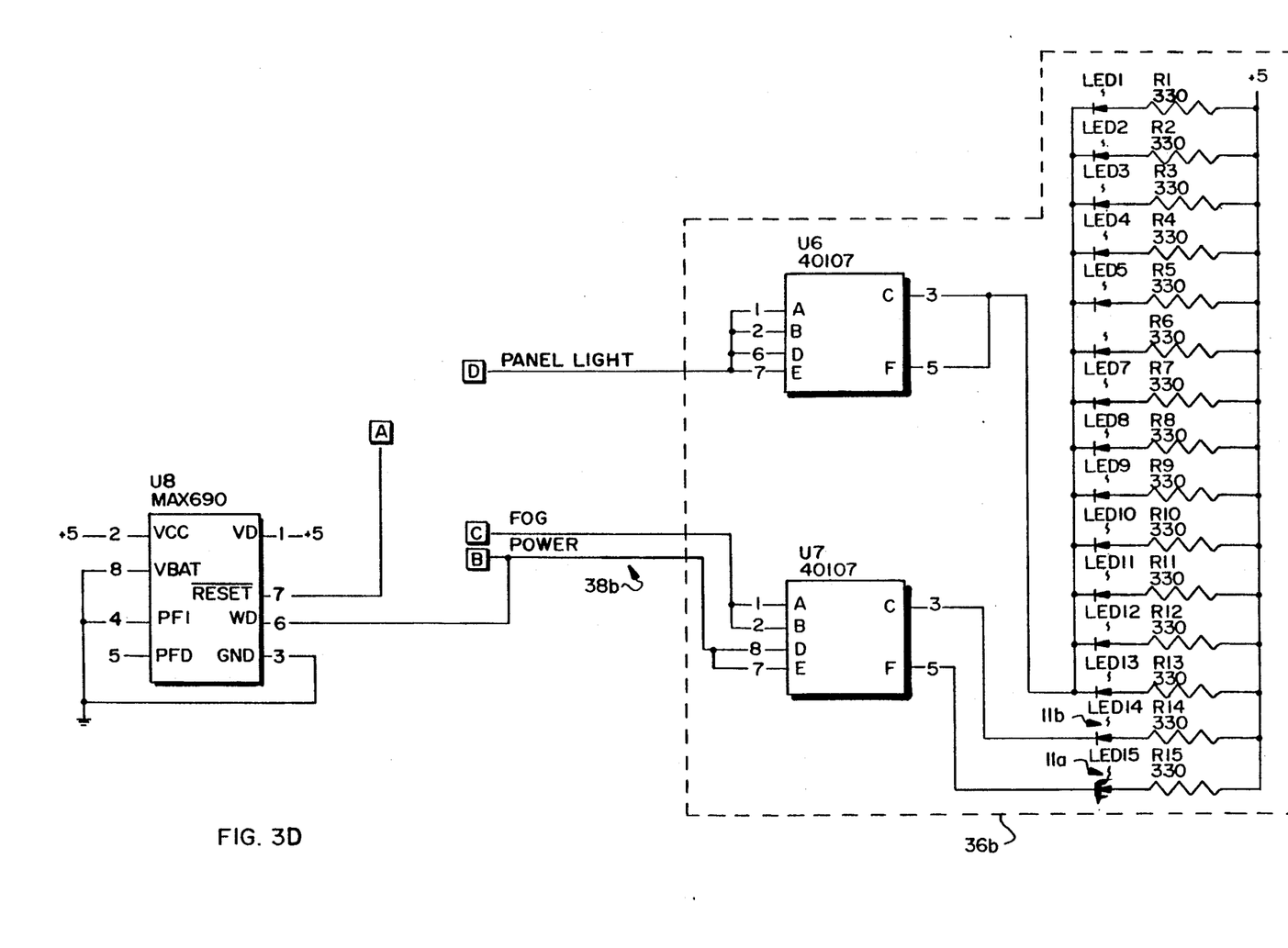

FIGS. 3A-3D are a detailed circuit diagram of the controller shown in FIG. 1. For viewing the interconnections between the Figures, FIG. 3B should be placed between FIGS. 3A and 3C with FIG. 3A located on the viewer's left. The interconnections with FIG. 3D are indicated by the boxed reference letters A, B, C and D found in FIGS. 3B and 3D. For consistency and clarity, circuitry shown in FIG. 3A-3D which corresponds to an element of either FIG. 1 or 2 is designated by the reference numeral previously used. Dashed line box 48 comprises circuitry for performing the horn interface function depicted in FIG. 2. Similarly, two dashed line boxes 36a and 36b comprise circuitry related to the user input function shown in FIG. 2, while the box 44 comprises circuitry for performing the memory function. The remaining circuitry shown in FIGS. 3A-3D relates to the control unit function shown in FIG. 2.

Within the horn interface circuitry 48 are four terminals numbered 1, 2, 3 and 4. Terminals 1 and 3 are for connection to a 12V DC power supply. Terminal 2 is for connection to ground potential and terminal 4 is for connection to a vessel's horn or horn system.

Within the user input circuitry 36a, the various keys of the keypad are arranged in "rows" and "columns." The four columns are denoted by the references C1-C4 above the top row of keys, while the rows are denoted by the references R1-R4. The significance of the row and column arrangement is described below. User input circuitry 36b comprises an array of thirteen light emitting diodes (LED1-LED13) for illuminating the thirteen keys of the keypad (when the PANEL LIGHT ON/OFF key 12 is pressed), as well as LED's 11a and 11b described above.

Memory 44 comprises a group of eight D flip-flops 52 and a read only memory (ROM) 54. Eight outputs of the flip-flops 52 are connected to eight of eleven address lines (the eight least significant bits) to the ROM 54. All eight outputs of the ROM 54 are connected, respectively, to the eight inputs of the flip-flops 52, thereby providing a feedback path. In other words, the data that appears at the outputs of the ROM 54 is fed back to the inputs of the flip-flops 52, as well as to an eight-bit bus (DB0-DB7) of a microcontroller 56. The flip-flops 52 and the ROM 54 are configured to operate as an algorithmic state machine in which the data or "state" at the outputs of the ROM 54 becomes an address to the ROM 54, which in turn determines the next future "state" or output of the ROM 54. The ROM 54 serves as a memory for the instructions that are to be executed by the microcontroller 56. Those instructions are output by the ROM 54 to the microcontroller 56 in accordance with a predetermined sequence which is defined when the ROM 54 is originally programmed or loaded with the desired instructions.

The microcontroller 56 includes four inputs P24-P27 which are coupled to four of the lines 38a which provide electrical signals indicative of which column of the keypad contains a key that is pressed. Similarly, the six remaining lines of lines 38a are coupled to six inputs (1A3-1A4 and 2A1-2A4) of an eight-bit buffer 58. Four of the lines coupled to the buffer 58 (inputs 2A1-2A4) provide electrical signals indicative of which row of the keypad contains a key that is pressed. The other two lines coupled to the buffer 58 (inputs 1A3 and 1A4) are connected directly to the PANEL LIGHT ON/OFF key 12 and the POWER ON/OFF key 10, respectively.

The buffer 58 includes four outputs (2Y1-2Y4) which are connected to four inputs (P14-P17) of the microcontroller 56. Two additional outputs of the buffer 58 (1Y3 and 1Y4) are connected to two inputs T0 and T1 of the microcontroller 56.

An output P10 of the microcontroller 56 is connected via line 46 to the horn interface circuitry 48. Similarly, an output P11 is connected via a line denoted POWER to the user input circuitry 36b. Also, an output P12 (via a line denoted FOG) and an output P13 (via a line denoted PANEL LIGHT) are also connected to the user input circuitry 36b.

Three additional outputs (P20-P22) of the microcontroller 56 are connected to three address inputs (the three most significant bits) of the ROM 54. In addition, an output PROGRAM STORE ENABLE (PSEN) of the microcontroller 56 is connected to an input OE of the ROM 54. Also, an output ADDRESS LATCH ENABLE (ALE) of the microcontroller 56 is connected to an input LE of the flip-flops 52.

The remaining circuitry shown in FIGS. 3A-3D consists of conventional electronic components which are well known and understood in the art and therefore will not be described further.

Representative examples of the detailed operation of the controller 2 will now be described with reference to FIGS. 3A-3D and 4. When the POWER ON/OFF key 10 is pressed (assuming the controller 2 is not already activated), electrical power is applied at step 60 to the microcontroller and certain other components of the controller 2. At step 62, the controller 2 executes an initialization procedure and turns on, by supplying an appropriate signal via output P11, the LED 11a which is part of the POWER ON/OFF key 10. The initialization procedure may include, for example, initializing various outputs of the microcontroller 56 to predetermined voltage levels, clearing or setting various internal status registers or "flags" of the microcontroller, clearing a random access memory (RAM) which is internal to the microcontroller, etc.

Figure 4:
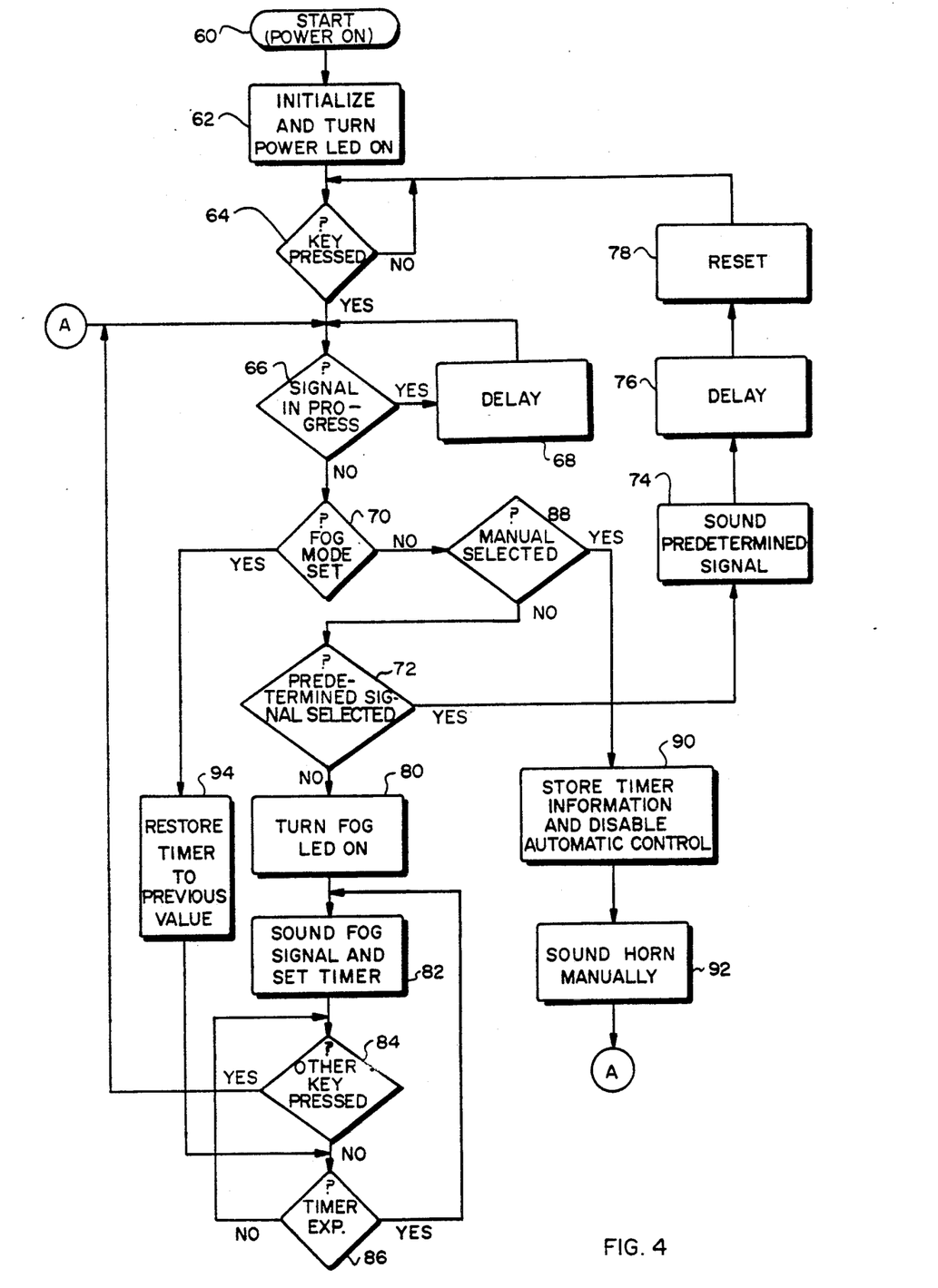
FIG. 4 is a flowchart diagram which depicts the steps performed, by the circuitry shown in FIGS. 3A-3D, to sound representative ones of the horn signals and horn modes provided by the controller.

At step 64, the microcontroller 56 seeks to determine whether any of the keys on the keypad was pressed. This determination is made by performing a "scanning" algorithm in which the microcontroller 56 successively applies a voltage to a single column of the keypad and simultaneously "reads" the rows to determine if a key is being pressed. For example, assume that the microcontroller 56 supplied a suitable voltage at its output P24, which is connected to column 1 of the keypad. If any of the keys in column 1 was pressed while the voltage was applied, a voltage would appear on the corresponding row of the pressed key, which would in turn appear at one of the inputs P14-P17. The microcontroller 56 reads the presence (or absence) of voltage at the inputs connected to the rows of the keypad (P14-P17) and stores that information as data for further processing. In a repetitive manner, the microcontroller 56 is able to "scan" all of the columns of the keypad individually and, ultimately, uniquely identify which key was pressed. In the case of inputs T1 and T0, the microcontroller 56 simply reads those inputs directly for the presence of a voltage indicating that either the POWER ON/OFF key 10 or the PANEL LIGHT ON/OFF key 12 was pressed.

If, at step 64, the microcontroller 56 does not detect that a key was pressed, it simply "loops" at step 64 and continues to monitor the keypad.

If, however, the microcontroller 56 determines that a key was pressed, the microcontroller then checks to determine whether a horn signal which was previously selected is still in the process of being executed. If so, the microcontroller 56 waits at step 68 for a predetermined delay before proceeding. In the preferred embodiment, the delay at step 68 is approximately 2.5 seconds following the completion of a previously selected horn signal. Such a delay is necessary in order to provide sufficient separation between consecutive horn signals to avoid confusion.

Alternatively, if the microcontroller 56 determines at step 64 that no previously selected signal is in progress, the microcontroller 56 checks at step 70 to determine whether a "fog mode" was previously set by the user. If a fog mode was previously set by the user, then the microcontroller 56 proceeds to step 94 where the microcontroller's internal timer is restored to its previous value, and then to step 86. (The function of the microcontroller's internal timer is described below in connection with step 82.) If no fog mode was previously set, then the microcontroller 56 checks at step 88 to determine whether the key pressed at step 64 was the MANUAL key 26. If the MANUAL key 26 was not the key pressed, then the microcontroller 56 proceeds to step 72 and checks whether the pressed key represents the selection of a predetermined horn signal.

If the pressed key represents a predetermined horn signal, the microcontroller 56 produces a suitable voltage via output P10, for a predetermined duration that is defined by the instructions received from the ROM 54, which in turn causes the vessel's horn to sound the appropriate signal.

Following the sounding of the selected predetermined horn signal, the microcontroller 56 waits at step 76 for a predetermined delay period (e.g., approximately 2.5 seconds) and then proceeds to step 78. At step 78, the microcontroller 56 resets any of its internal status flags, registers or the like, as applicable, and then returns to step 64 to again monitor the keypad.

At step 72, if the microcontroller 56 determines that the key pressed at step 64 was not a predetermined horn signal key (and by prior elimination was not the MANUAL key 26), then the pressed key must be one of the fog mode keys 30, 32 or 34. Thus, at step 80, the microcontroller 56, via its output P12, turns on the LED 11b to indicate that a fog mode is in effect. At step 82, the microcontroller 56, in a manner similar to that described above with respect to step 74, sounds the correct horn signal, and also starts an internal timer. The internal timer may be initially set for a predetermined period (e.g., two minutes for fog signals, as required by the rules of the road), and decremented down toward zero.

At step 84, the microcontroller 56 checks to determine whether another key on the keypad was pressed. If so, the process returns to step 66 and proceeds as described above. If not, at step 86, the microcontroller 56 checks to determine whether the internal timer has expired. If the timer has expired, meaning that it is time to sound the previously selected fog signal again, the microcontroller 56 returns to step 82, which results in another sounding of the selected fog signal and a resetting of the internal timer. If, at step 86, the timer has not yet expired, the microcontroller 56 "loops" to step 84 and continues to monitor the keypad.

Referring again to step 88, if the MANUAL key 26 was selected, the microcontroller 56 proceeds to step 90 where information regarding the microcontroller's internal timer is stored (in an internal register or internal RAM, for example) and automatic control of the vessel's horn by the controller 2 is temporarily disabled. At step 92, the vessel's horn is sounded manually by the user pressing and releasing the MANUAL key 26. As indicated by reference letter A, the process then returns to step 66 to determine whether the manually generated horn signal is still in progress. From step 66, the process proceeds as previously described.

Also, as described above in connection with steps 70 and 84, once a user has activated any of the fog modes, the user may subsequently press another key on the keypad (e.g., the TURN TO PORT key 14) and temporarily override the previously selected fog mode. In other words, the user may select one of the predetermined horn signals for immediate sounding, and the controller 2 will automatically revert to the previously selected fog mode once the predetermined signal is sounded. In so doing, the controller 2 will keep track of the elapsed time on the internal timer and resume timing automatically without intervention by the user.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. An apparatus for controlling a vessel's horn, said apparatus comprising:
   (A) horn interface means, said interface means for coupling at least one horn to said apparatus;
   (B) user input means, said input means for allowing a user to select a desired horn signal from a plurality of predetermined horn signals or a desired horn mode from a plurality of predetermined horn modes,
      wherein each of said predetermined horn signals comprises a single sequence of horn blasts, and
      wherein each of said predetermined horn modes comprises a repetitious sequence of horn blasts, at least one of said predetermined horn modes operating such that at least one of said predetermined horn signals selected by said user may temporarily override said at least one predetermined horn mode;
   (C) memory means, said memory means for storing instructions for sounding said at least one horn in accordance with said plurality of predetermined horn signals and said plurality of predetermined horn modes; and
   (D) control means, coupled to said horn interface means, said user input means and said memory means, said control means for using, in response to said user input means, said instructions stored in said memory means to sound said at least one horn.

2. The apparatus as in claim 1 wherein said user input means comprises a keypad means, said keypad means having a plurality of keys, at least one of said plurality of keys for selecting one of said predetermined horn signals or one of said predetermined horn modes.

3. The apparatus as in claim 1 wherein said user input means includes illumination means for aiding a user in operating the user input means in darkness.

4. The apparatus as in claim 1 wherein said user input means further comprises means for manually sounding said horn.

5. The apparatus as in claim 1 wherein said at least one of said plurality of predetermined horn modes is a fog mode, said apparatus being responsive to the selection of said fog mode to repeatedly sound a predetermined sequence of horn blasts followed by a period of time which does not exceed a predetermined maximum time.

6. The apparatus as in claim 1 further comprising a mounting means, said mounting means for securing said apparatus to a desired surface or object.

* * * * *